United States Patent
Mammadli et al.

(10) Patent No.: US 12,050,686 B2
(45) Date of Patent: Jul. 30, 2024

(54) SYSTEM AND METHOD FOR ANOMALOUS DATABASE ACCESS MONITORING

(71) Applicant: ROYAL BANK OF CANADA, Toronto (CA)

(72) Inventors: Nariman Mammadli, Toronto (CA); Hamidreza Sattari, Toronto (CA)

(73) Assignee: ROYAL BANK OF CANADA, Montreal (CA)

(*) Notice: Subject to any disclaimer, the term of this patent is extended or adjusted under 35 U.S.C. 154(b) by 207 days.

(21) Appl. No.: 17/459,415

(22) Filed: Aug. 27, 2021

(65) Prior Publication Data
US 2022/0067160 A1 Mar. 3, 2022

Related U.S. Application Data

(60) Provisional application No. 63/070,902, filed on Aug. 27, 2020.

(51) Int. Cl.
  *G06F 21/56* (2013.01)
  *G06F 16/21* (2019.01)
  *G06F 21/57* (2013.01)
  *G06F 21/62* (2013.01)

(52) U.S. Cl.
  CPC ............ *G06F 21/566* (2013.01); *G06F 16/21* (2019.01); *G06F 21/577* (2013.01); *G06F 21/6218* (2013.01); *G06F 2221/034* (2013.01)

(58) Field of Classification Search
  CPC ...... G06F 21/566; G06F 16/21; G06F 21/577; G06F 21/6218; G06F 2221/034; G06F 21/552
  See application file for complete search history.

(56) References Cited

U.S. PATENT DOCUMENTS

| | | | | |
|---|---|---|---|---|
| 9,516,053 | B1* | 12/2016 | Muddu | G06F 3/0484 |
| 11,475,125 | B2* | 10/2022 | Sunkavally | G06F 16/244 |
| 2005/0149502 | A1* | 7/2005 | McSherry | G06F 16/9538 |
| 2008/0140358 | A1* | 6/2008 | Lang | G06F 30/18 |
| | | | | 703/1 |

(Continued)

OTHER PUBLICATIONS

Sun, J. et al., Neighborhood Formation and Anomaly Detection in Bipartite Graphs [online], Fifth IEEE International Conference on Data Mining (ICDM05) Nov. 27-30, 2005, doi: 10.1109/icdm.2005.103, retrieved from the Internet: <https://ieeexplore.ieee.org/document/1565707>.

(Continued)

*Primary Examiner* — Meng Li
(74) *Attorney, Agent, or Firm* — Norton Rose Fulbright Canada LLP

(57) ABSTRACT

Systems and methods for database access monitoring are provided. The system comprises at least one processor and a memory storing instructions which when executed by the at least one processor configure the at least one processor to perform the method. The method comprises receiving login event data, generating a vector representation of a subject entity and a vector representation of an object entity associated with a login event in the login event data, determining a distance between the subject entity and the object entity, and determining an anomaly score for the subject entity and the object entity. The anomaly score based at least in part on the distance between the subject entity and object entity.

20 Claims, 12 Drawing Sheets

(56) References Cited

U.S. PATENT DOCUMENTS

| | | | | |
|---|---|---|---|---|
| 2012/0330864 | A1* | 12/2012 | Chakrabarti | G06F 16/951 |
| | | | | 706/13 |
| 2014/0095425 | A1* | 4/2014 | Sipple | G06N 5/02 |
| | | | | 706/52 |
| 2018/0081880 | A1* | 3/2018 | Kennedy | G06F 16/24578 |
| 2018/0316704 | A1* | 11/2018 | Joseph Durairaj | H04L 41/142 |
| 2019/0056969 | A1* | 2/2019 | Khandros | G06F 11/3409 |
| 2021/0326438 | A1* | 10/2021 | Dichiu | G06F 21/56 |
| 2022/0067160 | A1* | 3/2022 | Mammadli | G06F 21/6218 |
| 2022/0086179 | A1* | 3/2022 | Levin | H04W 12/63 |
| 2022/0407878 | A1* | 12/2022 | Harris | G06N 5/04 |
| 2022/0413947 | A1* | 12/2022 | Singla | G06F 9/542 |

OTHER PUBLICATIONS

Nikhil, N., Facebook Research just published an awesome paper on learning hierarchical representations [online], Jun. 14, 2017, retrieved from the Internet: <https://towardsdatascience.com/facebook-research-just-published-an-awesome-paper-on-learning-hierarchical-representations-34e3d829ede7>.

Khosla, M. et al., A Comparative Study for Unsupervised Network Representation Learning [online], retrieved from the Internet: <https://arxiv.org/pdf/1903.07902.pdf>.

* cited by examiner

500

Determine personal page rank for CLIENT_HOSTNAME → PPR (client_hostname)
502

Determine personal page rank for SOURCE_PROGRAM → PPR (source_program)
504

Determine personal page rank for DATABASE_ACCOUNT → PPR(database_account)
506

JOINT_PPR(PPR(client_hostname),PPR(source_program)) → PPR (client_hostname & source_program)
508

Determine return KL (PPR(client_hostname & source_program) → PPR(database_account)
510

FIG. 5

SYSTEM AND METHOD FOR ANOMALOUS DATABASE ACCESS MONITORING

CROSS REFERENCE TO RELATED APPLICATIONS

This application is a non-provisional of, and claims all benefit, including priority, to U.S. Application No. 63/070,902, dated Aug. 27, 2020 entitled SYSTEM AND METHOD FOR ANOMALOUS DATABASE MONITORING and incorporated herein in its entirety by reference.

FIELD

This disclosure relates to computer security, in particular to database access monitoring.

BACKGROUND

Within an organization or enterprise, various databases or systems are accessed by scheduled services, automatic login events, and human users (such as employees). As a result, a large volume of login events are generated as databases are accessed.

Existing approaches to monitor database access, for example, by monitoring login events, rely on access controls and static policies. These techniques may not be suitable for managing a large volume of login events, and in an unsupervised setting, may not be able to effectively identify risk associated with login events.

SUMMARY

In one embodiment, there is provided a system for database access monitoring. The system comprises at least one processor and a memory storing instructions which when executed by the at least one processor configure the at least one processor to: receive login event data, generate a vector representation of a subject entity and a vector representation of an object entity associated with a login event in the login event data, determine a distance between the subject entity and the object entity, and determine an anomaly score for the subject entity and the object entity. The anomaly score based at least in part on the distance between the subject entity and object entity.

In another embodiment, there is provided a method of database access monitoring. The method comprises receiving login event data, generating a vector representation of a subject entity and a vector representation of an object entity associated with a login event in the login event data, determining a distance between the subject entity and the object entity, and determining an anomaly score for the subject entity and the object entity. The anomaly score based at least in part on the distance between the subject entity and object entity.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will become apparent to those skilled in the art following a reading of the following description in conjunction with the drawings.

BRIEF DESCRIPTION OF DRAWINGS

Embodiments will be described, by way of example only, with reference to the attached figures, wherein in the figures:

FIG. 5 illustrates, in a flowchart, an example of a method of quantifying the anomaly for a given path, in accordance with some embodiments;

It is understood that throughout the description and figures, like features are identified by like reference numerals.

DETAILED DESCRIPTION

Figure 1:
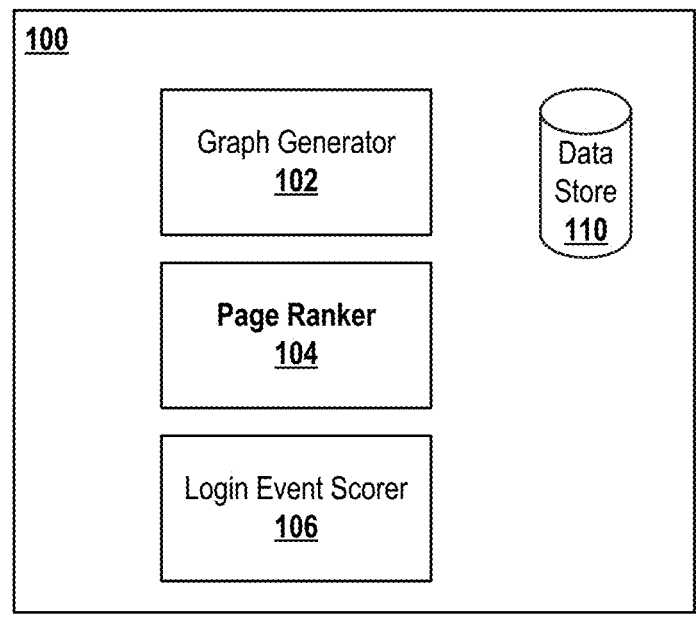
FIG. 1 illustrates an example of a system for monitoring database access, in accordance with some embodiments.

Embodiments of methods, systems, and apparatus are described through reference to the drawings.

In many organizations, hundreds of thousands of login (or logon) events occur every minute against various systems, databases or accounts (for example, that belong to a database) across the organization. It can be challenging to assess the risk of these events and detect cases such as lateral movement, privilege escalation, account takeover, account sharing and the like. Existing static rule-based systems generate too many alerts for a small team to go through manually, and the false positive rate is often higher than acceptable. There is a need for a new risk scoring mechanism that learns behaviour and assigns context aware risk scores with lower false alarm rate.

Systems and methods disclosed herein may take the actual login behaviours into account and derive policies from patterns existing in these behaviours. Techniques disclosed herein can assign risk scores to hundreds of thousands of login events that occur every minute against databases in an organization, such as a financial institution.

Systems and databases of interest in an organization can include critical servers that are crucial to keep the business running, and can also contain sensitive information loss of which can lead to unfortunate downhill path. Therefore, monitoring of interactions with such servers can be vitally important to detect or prevent malicious attacks or improper usage.

Systems and methods disclosed herein may further strengthen existing monitoring tools using machine learning and statistical techniques. Suspicious logon attempts to critical servers can be identified, in an example, by analyzing Windows audit logs for successful login events.

A determination of whether a login event is suspicious or normal may be determined by a model imposed on login event data. In some embodiments, a graph-based model can be used. A graph-based approach can represent data differently than conventional non-graph representation techniques that are used to identify anomalies in data.

For example, a non-graph representation converts each login event into a sequence of numbers/vector then a chosen model can use such a representation to detect an anomaly. By contrast, graph representation as used herein can convert data into a graphical representation (or "picture") of vertices connecting to one another via edges and used to detect an anomaly. Vector representations of each node in the graph can be generated/derived from the graph representation. Anomalies detected by a graph theoretic approach may be more easily interpretable.

Conveniently, a graph-based representation may also be less vulnerable to attacks, as systems and methods disclosed herein may utilize a graph-based representation of a holistic network of entities, which may be more difficult to reproduce or bypass.

With data, such as login event data, represented in a graph-based representation, a model, including a PageRank algorithm, can be imposed on the graph-based representation to detect outliers.

FIG. 1 illustrates an example of a system 100 for monitoring database access, in accordance with some embodiments. System 100 can be configured to assign risk scores to login events that occur by a user accessing a database or system.

In an example, system 100 may identify suspicious login activities (for example, a successful logon as documented by Windows Security Log Event ID 4624) that are associated with servers that have been identified as critical. System 100 can assess a risk for each login event and return a fraction of high confident results for further analysis.

In some embodiments, system 100 analyses the events in the given time window (for example, three days, two weeks, etc.). The longer the window, the higher the computational cost. Thus, there may be a trade-off between the length of this window (or the computational cost) versus the reliability of the results.

As illustrated in FIG. 1, system 100 can include a graph generator 102, a page ranker 104, a login event scorer 106 and a data store 110.

Graph generator 102 receives login event data, each login event containing information relating to a user attempting to access (or login to) a database, to generate a graph-based representation of the login event data.

In some embodiments, login event data can include information related to a human user, a source computer or software, an account being attempted, a database, and an indication as to whether the login attempt failed or succeeded.

In some embodiments, graph generator 102 is a graph engine that can be run either locally or in a distributed fashion. A distributed graph engine may be preferable for a large scale of data being analyzed.

In some embodiments, a graph can be generated for login events over a pre-determined period of time.

In some embodiments, a big data processing framework (such as pyspark) can be used to engineer features of login event data before passing the data to graph analysis. In some embodiments, an Anaconda distribution of Python can be used to access common big data libraries.

Graph generator 102 generates a graph to represent the login events, the graph representation including nodes for users and databases that are connected by edges.

A graph, as generated by graph generator 102, is a collection of vertices (or nodes) connected to one another via edges. Edges can be directed or not.

Each user and each database can be represented as a node. The weight of an edge can be defined by the number of times a user accessed a given database or the frequency at which the access happened over a given time window, such as the periodicity of the access (to reflect whether access is more frequent or more sporadic).

Graph-based representations of login events that are generated by graph generator 102 may be stored in data store 110.

Page ranker 104 can be configured to execute a personalized or weighted PageRank algorithm, to determine a personalized PageRank for each user or database based on a graph-based representation generated by graph generator 102. The determination of a PageRank may be performed periodically or at pre-determined time intervals.

In some embodiments, page ranker 104 takes as input a graph, a source node (if generating a personalized PageRank), and hyper parameters defining the nature of a random walk, the random walk described in further detail below. In some embodiments, page ranker 104 returns back a dictionary where keys are the nodes of the graph and values are the PageRank value.

In some embodiments, page ranker 104 may be part of a graph engine.

To determine a PageRank for a user, page ranker 104 may start from a given source node of a graph-based representation and walks randomly on the graph following edges. The source node is the entity that is being personalized—such as user or database. The random walk may be determined by throwing a fair dice and follow one of the edges leading out. As certain edges may have weights (based on an importance criterion that is quantified), the weights can be used to cause the random walk have some preference (for example, by way of biased dice) while moving from node to node.

Page ranker 104 may perform a random walk many times (in an example, a million times) to assess a probability of landing upon other nodes in the graph given that the journey starts from the source node. These probabilities can be considered to quantify the proximity of nodes to one another.

In some embodiments, a personalized PageRank for a source (user or database) includes a vector of elements. Each element is associated with every other node (user or database) in the graph. Each element has a value or number representing the intensity of the relationship between the source and the other node.

Page ranker 104 can also be configured to determine non-personalized page rank.

Page ranker 104 determines a non-personalized PageRank in a similar manner to personalized PageRank, described above, without having a predefined source node. Unlike determining a personalized PageRank, to determine a non-personalized PageRank, every random walk starts from a random node.

A personalized PageRank is analogous to a conditional probability while non-personalized PageRank resembles an unconditional probability.

Personalized PageRanks may be associated with a user identity and stored in data store 110. Non-personalized PageRanks can also be stored in data store 110.

To evaluate a login event (when a user logs into a database), login event scorer 106 determines an anomaly or risk score for the login event.

Login event scorer 106 identifies other users who have also accessed the database in the past, by accessing login event data from data store 110. PageRank data of the other users is retrieved from data store 110.

In some embodiments, login event scorer 106 evaluates if two "unrelated" users accessed the same database (or account) in a given time interval.

To quantify how unrelated or related users are, personalized PageRanks can be used. The PageRank of the user is compared to the PageRanks of the other users to determine an average distance between the PageRanks. In some embodiments, average distance is measured using Kullback-Leibler divergence.

In an example, a pairwise comparison of PageRank can be used to quantify the distance between users i and j who have accessed the same critical account in a critical server, as follows: Using the personalized PageRank vector calculated for user i by page ranker 104, the distance between i and j can be determined by looking up the vector element value for user j in the personalized PageRank vector for user i.

Figure 2A:
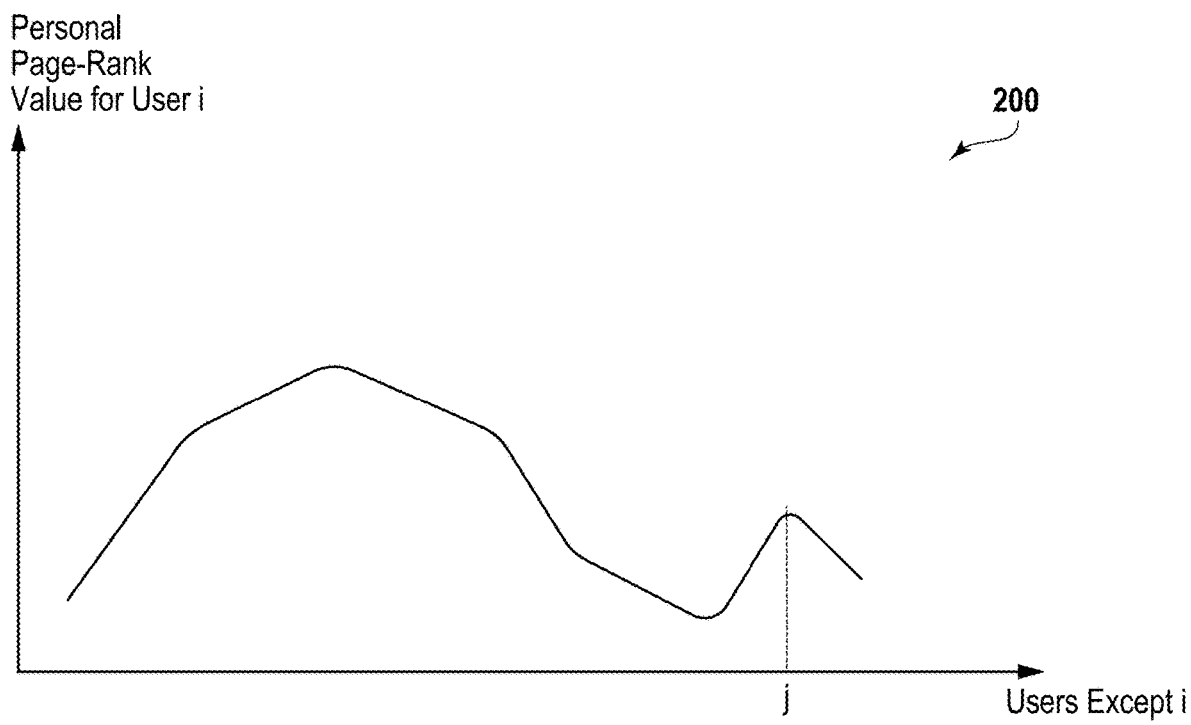
FIG. 2A illustrates a graph of personalized PageRank values for a user, in accordance with an embodiment.
Figure 2B:
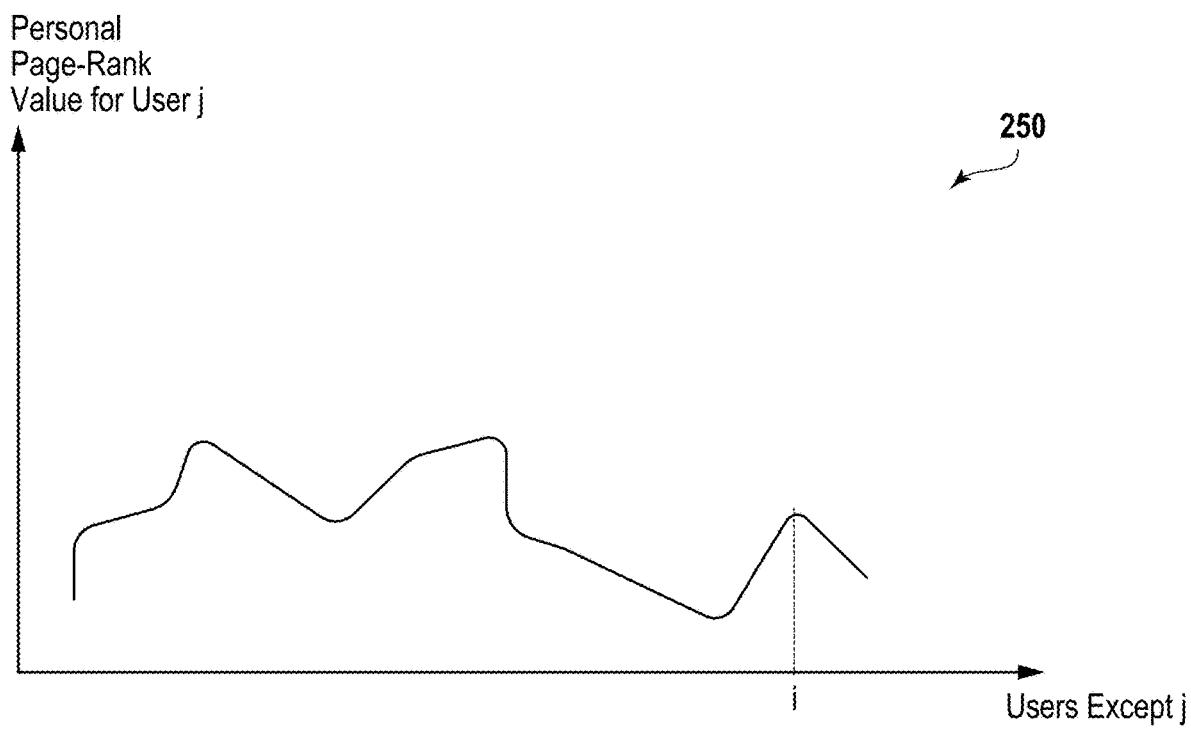
FIG. 2B illustrates a graph of personalized PageRank values for another user, in accordance with an embodiment.

FIG. 2A illustrates, in a graph 200, an example of personalized PageRank vector values for user i, in the y-axis, and the vector elements along the x-axis, for elements of other users, including user j, as labelled. FIG. 2B illustrates, in a graph 250, an example of personalized PageRank vector values for user j, in the y-axis, and the vector elements along the x-axis, for elements of other users, including user i, as labelled.

A pairwise comparison of PageRank between users i and j may not necessarily be symmetric, since the value of j in personalized PageRank for i (notated as distance(i,j)) may not equal the value of i in personalized PageRank for j (notated as distance(j,i)). A new symmetric distance measure can be defined as the addition of distance(i,j) and distance (j,i).

A pairwise distance calculation between users i and j may appear relatively close to each other (because of the peaks in respective positions in the distribution). However, looking at the whole distribution illustrated in FIGS. 2A and 2B, visible differences can be seen between the two distributions.

Other techniques may quantify distance or closeness between and take into consideration the whole PageRank distribution rather than small local part of it. In another example, a personalized PageRank can be calculated by page ranker 104 for users i and j, and the two PageRank vectors can be compared using techniques such as cosine similarity, KL divergence, or other suitable technique.

In some embodiments, login event scorer 106 determines how much the average distance deviates from an average distance recorded across all login events across the organization. The value of the deviation may be recorded as an anomaly score or a risk score.

In some embodiments, a login event may be designated as anomalous if the risk score for that login event exceeds a given threshold.

In some embodiments, anomaly risk scores may be ranked based on the privilege of the database or account that is affected.

In experimental work to-date, feasibility has been confirmed by sample results generated using prototype embodiments of systems and methods disclosed herein. The prototype successfully detected some abnormal looking login events.

Figure 3A:
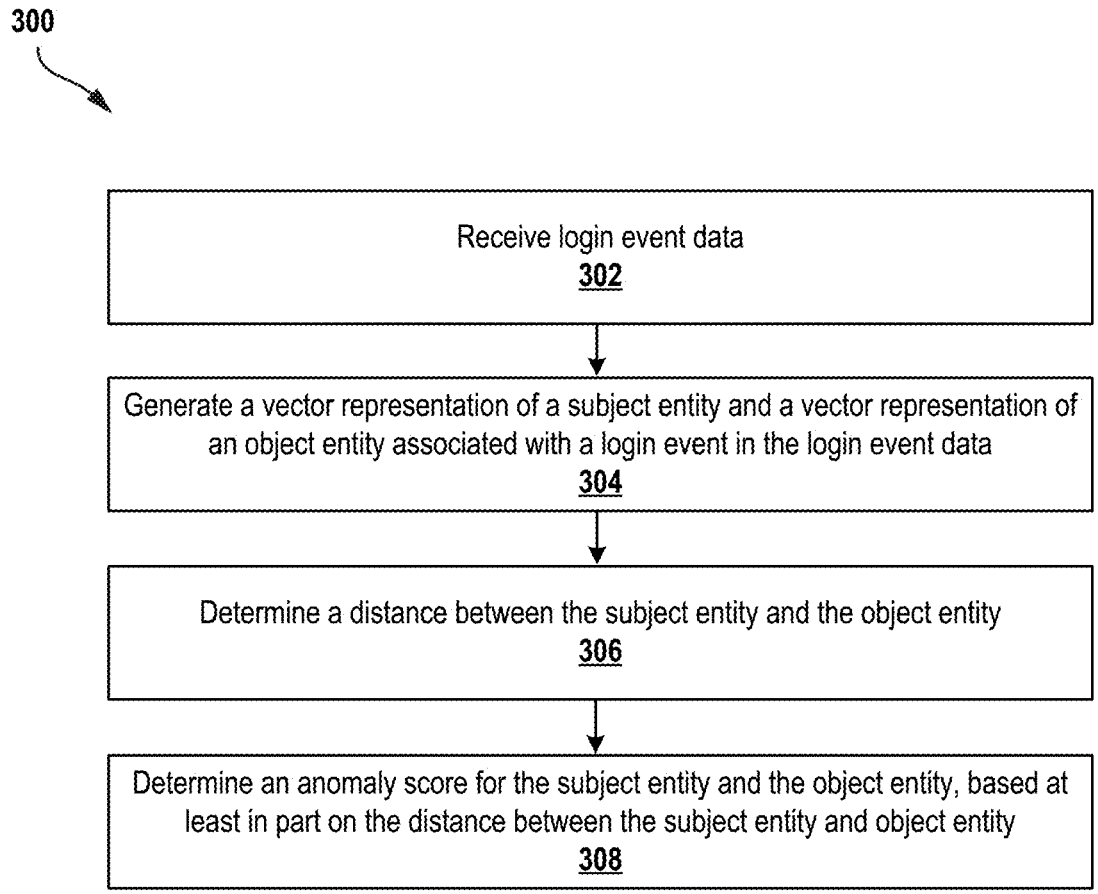
FIG. 3A illustrates, in a flowchart, an example of a method for monitoring database access, in accordance with some embodiments.

FIG. 3A illustrates, in a flowchart, an example of a method 300 for monitoring login access, in accordance with some embodiments. The method 300 may be performed by component(s) of system 100, such as graph generator 102, page ranker 104, and/or login event scorer 106, according to an embodiment. The steps are provided for illustrative purposes. Variations of the steps, omission or substitution of various steps, or additional steps may be considered.

At block 302, login event data is received by graph generator 102. In some embodiments, the login event data is for a specified time window. In some embodiments, login events rows include the following fields:
- OS_User, client hostname (also its internet protocol (IP)),
- source program, server hostname (also its IP),
- database account name,
- database name,
- is_succeeded (if login attempt succeeded), and
- time of the attempt.

I.e., every row provides that: i) there was a login attempt in a given time, ii) whether succeeded or not, against a database account that resides in a given database, iii) from a computer-controlled by OS_User via a software program given in source program field. Every row can be represented as a path OS_User—client host—source program—database account—database and added to a graph. The undirected version of this graph will be considered.

At block 304, a vector representation of a subject entity and a vector representation of an object entity associated with a login event in the login event data are generated.

In some embodiments, the vector representation comprises a graph-based representation of login event data.

There are several nuances to consider in building the above-mentioned graph. The order of entities in every path to be added has an impact on the graph. For example, in client host→source program→database account→database the client host has one hop from the source program, but in the case of client host→database account→source program→database client, there are two (2) hops. One might reason that the client host must be directly connected to the source program due to their logical relationship (program runs in client computer), and database account must be directly connected to the database (account resides within the context of a database). The same goes for OS_User and client computer since OS_User is using the computer to initiate the login event.

a) CLIENT_HOSTNAME—SOURCE_PROGRAM
b) DATABASE_ACCOUNT—DATABASE
c) OS_USER—CLIENT_HOSTNAME

The next step is to combine sub-paths above into a complete path:
OS_USER—CLIENT_HOSTNAME—SOURCE_PROGRAM—DATABASE_ACCOUNT—DATABASE From another perspective, in any login event, there are actors and there are tools via which these actors operate. The human user (OS_User) is an actor that utilizes a software program (source program) that utilizes the computer (client_hostname) to unlock an account (database account). The account is also a symbolic actor (for instance, your accounts in your personal computers carry your name). The human user intends to interact with the account, the rest are the details via which this event takes place. Then every path may be represented in a way that OS_User is directly connected to database account. The purpose is to find anomalies. A minimalistic graph may be built to limit the number of fields in consideration that shows the relationship of OS_Users with database accounts.

a) OS_USER—DATABASE_ACCOUNT

The source program is the second field after OS_USER that acts as an actor since a program has a built-in logic that determines its intentions. If OS_User field was not available, and if this reasoning is followed, then source program and database account may be selected in a minimalistic setting:

b) SOURCE_PROGRAM—(OS_USER)—DATABASE_ACCOUNT

Following recursively:

c) CLIENT_HOSTNAME—SOURCE_PROGRAM—OS_USER—DATABASE_ACCOUNT—DATABASE

The end paths are similar in these two lines of reasoning, except the position of the OS_USER.

The weight of edges can be mapped to the number of times a given combination of entities occurs in data. Adding one path at a time to the graph, some paths and also some sub-paths will repeat, and in the final graph, weights will form naturally that reflects how common a given sub-path is in the data. For the current purposes, only successful attempts are considered, meaning that, if a login event failed the path implied is not added in that event into the graph. Note that, there are other ways of defining the weight; such as frequency of the path, or the periodicity of the path (meaning if a path occurs on schedule it is more permanent than if it occurs casually). These options may be explored and the performance gains quantified in a supervised learning problem.

In some embodiments, graph-based representations comprise personalized PageRank vectors.

Representing the incoming data in a graph as prescribed above gives a starting point to extract some quantitative information to act upon. In the present case, the focus is on structural features. Structural features that can be extracted from a graph are of two types: node attributes and node embedding. Node attributes are features such as in or out-degree: the number of neighbours, number of triangles of which the node is a part. Node embedding is a similar idea to embedding words in a vector space to capture their context, specifically to define a word not by its specific attributes but solely by its relationship to all the other words in the dictionary (part to whole). Multiple algorithms exist in the literature for node embeddings. In the present case, the focus is on personal page rank vectors for the purpose. In some embodiments, the asymmetric nature of page rank is favoured for detecting anomalies in the cybersecurity context because the entities present in the graph obey some hierarchical relationship and we believe asymmetric methods are ideal to capture such a relationship. To prevent immature saturation in dead-end nodes, we apply this embedding on an undirected graph.

Page rank vector has the size of N, N being the size of the graph. For larger graphs, computations are bottlenecked due to large vector sizes. In some embodiments, principle component analysis (PCA) style methods can be employed to reduce the dimensions of page rank vectors. Given that the graph is comprised of entities that naturally fall into communities, a considerable (~60%) reduction in dimension size is likely to be achieved via PCA.

At block 306, a distance between the subject entity and the object entity is determined.

In some embodiments, Kullback-Leibler (KL) divergence is used as a distance metric between embeddings. After every node is assigned a vector that summarizes its context in the graph, a method for comparison may be used to complete the mathematical modeling of the problem. Personal page rank is a probability distribution, not just because its elements sum up to 1, but conceptually as well. It is the stable distribution of random walks on the graph. KL divergence is specialized in quantifying distances between different probability distributions, therefore it may be chosen as our metric for comparison. However, KL divergence also has an interesting intuitive machinery.

Imagine two entities A and B whose behaviour is summarized in respective probability distributions over all possible states, P(A) and P(B). Also imagine entity C who is about to make some observations about A and B. In information theory, Shannon's surprise is a concept that is used to quantify the average surprise upon observation (which is also called entropy).

Now, consider the following scenarios:

1) C believes that it is observing A and its belief is true; the entity that generates the data is indeed A. C is surprised by the amount S1.
2) C believes that is observing A, but the entity that generates the data is B, not A. C is surprised by the amount S2.

Figure 4:
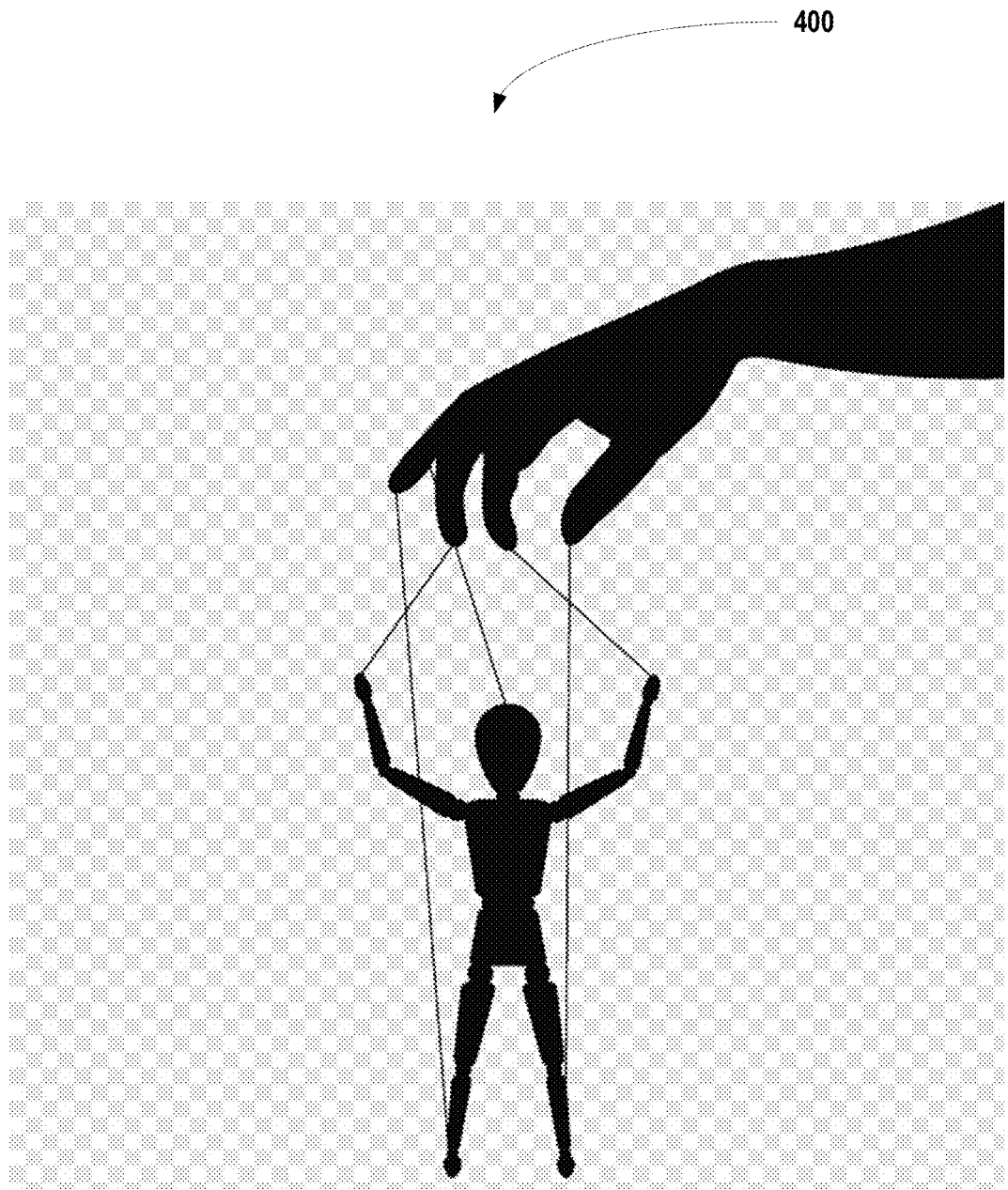
FIG. 4 illustrates an example of a visual representation of the KL divergence between a human and a doll, in accordance with some embodiments.

KL divergence from B to A denoted as KL(B→A) is the difference between S1 and S2, KL(B→A)=S2-S1. If S2-S1 is high, that means B's imitation of A was not good enough, since it raised higher surprise than scenario 1. Note that, KL is asymmetric, meaning KL(A→B) is not always equal to KL(B→A). If KL(A→B)<KL(B→A) A imitates B better than vice versa. KL seems to be a perfect fit for detecting bad login events since in the essence of any login event, lies the scenario that the client claims to have ownership for an account (which is a symbolic client itself). If this claim is legitimate, then the mathematical projection of this fact must be reflected in low KL(client→account), the client must be imitating account very well. FIG. 4 illustrates an example of a visual representation 400 of the KL divergence between a human and a doll, in accordance with some embodiments. KL (human→doll)<<<KL (doll→human).

Personal page ranks as embedding vectors embed nodes in a vector space. The relationship between the embedding cannot be formulated unless a comparison metric is also developed. The nature of the comparison metric determines the structure of the embedding space. In word2vec settings, for example, cosine similarity is used. The implication of cosine similarity, due to its symmetric nature is that it results in a flat embedding; in other words, the hierarchical relationship between different words is ignored.

In some embodiments, hierarchy may be added to the word embeddings. An asymmetric metric may be chosen and KL divergence described above fits the criterion. Using KL, database accounts may be ranked based on the imitation power of others. The first ranking account is the one that can imitate all the other accounts present in the graph. Capturing an account that can imitate other accounts does in principle imply more risk, because that means, using that account an attacker can carry out a more diverse set of activities against the victim network. Such a ranking of accounts enables one to prioritize the anomalies according to their inherent risk.

At block 308, an anomaly score (e.g., a risk score) for the subject entity and the object entity is determined, based at least in part on the distance between the subject entity and the object entity. In some embodiments, a risk score may be assigned to each login event.

In some embodiments, the column OS_USER is not utilized. The path for every login event looks as follows:
CLIENT_HOSTNAME—SOURCE_PROGRAM—DATABASE_ACCOUNT—DATABASE FIG. 5 illustrates, in a flowchart, an example of a method 500 of quantifying the anomaly for a given path, in accordance with some embodiments. A function compute_KL (CLIENT_HOSTNAME—SOURCE_PROGRAM—DATABASE_ACCOUNT—DATABASE) may be used, where a personal page rank for CLIENT_HOSTNAME→PPR (client_hostname) is first determined 502. Next a personal page rank for SOURCE_PROGRAM→PPR (source_program) is determined 504. Next, a compute personal page rank for DATABASE_ACCOUNT→PPR(database_account) is determined 506. Next, a function JOINT_PPR (PPR(client_hostname),PPR(source_program))→PPR (client_hostname & source_program) is performed. Next, a compute return KL (PPR(client_hostname & source_program)→PPR(database_account) is determined 508.

Computing the average of two personal page ranks is similar to asking what the joint embedding of two entities is. In the natural language processing (NLP) setting, the question would be: given the embedding for the word 'nice' and 'weather', what would be the embedding for 'nice weather'? Again, having personal page ranks as probability distributions makes the computation of the joint embedding straightforward. The rank of A on any third entity C is the probability of landing on C from A. The same goes for B. The joint rank over C starting from either A or B equals P(landing on C from A)+P(landing on C from B)−P(landing on C from A)*P(landing on C from B). The last term is the correction term.

Figure 6:
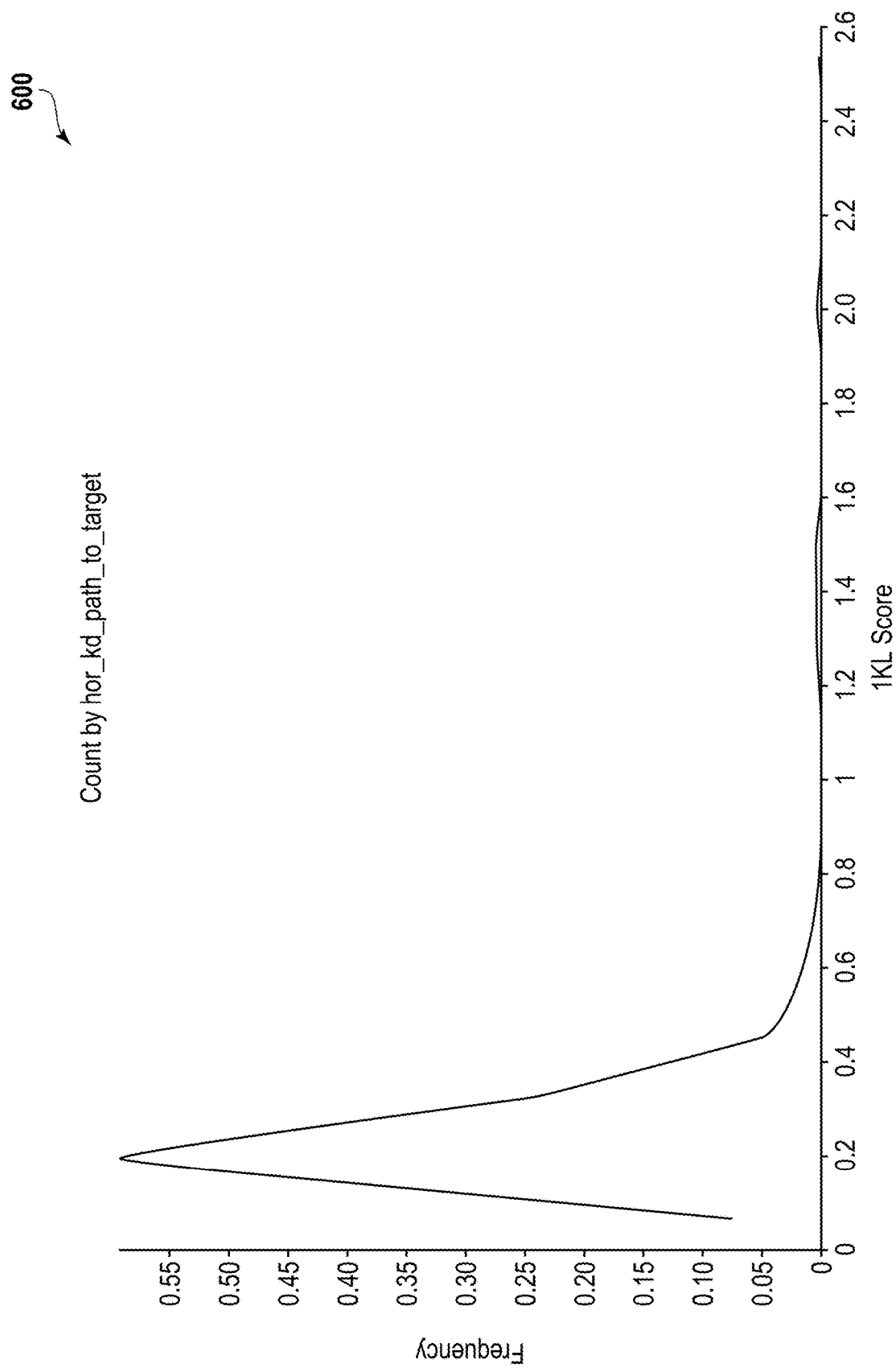
FIG. 6 illustrates, in a graph, an example of a KL score distribution for login combinations occurring in a sample week, in accordance with some embodiments.

JOINT_PPR(PPR1, PPR2) returns normalized (PPR1+PPR2−PPR1*PPR2). After computing the KL score for every login event in a given time interval. The distribution of the KL score is analyzed. FIG. 6 illustrates, in a graph, an example of a KL score distribution 600 for login combinations occurring in a sample week, in accordance with some embodiments. The resulting distribution is approximately a Gaussian with a long tail on the right side, the tail is where the suspicious logins live.

One can select anomalies from the global distribution (for example, anything beyond>=3 standard deviations from the mean) or distributions local to every database account. The latter is a way to correct the score to the database account. The reasoning behind this is that some accounts might be generic and as a result, KL scores for clients logging in to those accounts might be naturally high. Correcting with respect to account normalizes that inherent difference between accounts in terms of their specificity and generality.

In some embodiments, vector representations of a plurality of subject entities and a plurality of object entities associated with a plurality of login events in the login event data are generated. For each login event, a determination is made for a login event distance between a linear combination of the subject entity vector representations and a linear combination of the object entity vector representations. Next, a distribution for the login event distances is determined. Next, a threshold value based on the distribution is determined, and an anomaly login event is identified by its distance being past the threshold value.

In some embodiments, the login event distances comprise KL divergences, the linear combination of the subjects comprises at least an identified computer and an identified software running on the computer, and the linear combination of the objects comprises at least an account identifier and the database.

In some embodiments, the vector representations comprise learned embedding type vector representations of the login event data. A neural network may be trained to learn the embedding type vector representations. In some embodiments, the login event distances comprise cosine distances, the linear combination of the subjects comprises at least an identified computer and an identified software running on the computer, and the linear combination of the subjects comprises at least an account identifier and the database.

Figure 3B:
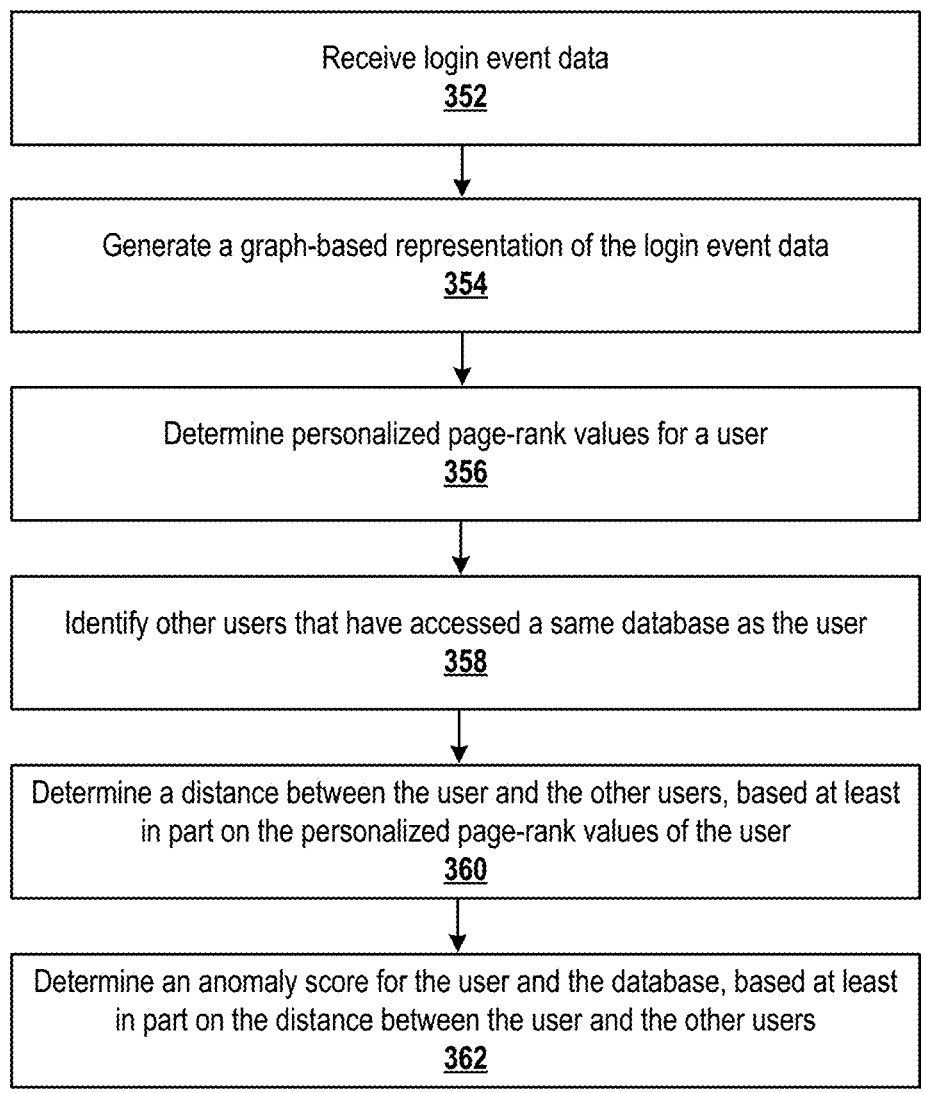
FIG. 3B illustrates, in a flowchart, an example of a method for monitoring login access, in accordance with some embodiments.

FIG. 3B illustrates, in a flow chart, another example of a method 350 for monitoring database access, in accordance with some embodiments. The method 350 may be performed by component(s) of system 100, such as graph generator 102, page ranker 104, and/or login event scorer 106, according to an embodiment. The steps are provided for illustrative purposes.

Variations of the steps, omission or substitution of various steps, or additional steps may be considered.

At block 352, login event data is received by graph generator 102.

At block 354, graph generator 102 generates a graph-based representation of the login event data.

At block 356, page ranker 104 determines personalized PageRank values for a user.

At block 358, page ranker 104 identifies other users that have accessed a same database as the user.

At block 360, login event scorer 106 determines a distance between the user and the other users, based at least in part on the personalized PageRank values of the user.

At block 362, login event scorer 106 determines an anomaly score for the user and the database, based at least in part on the distance between the user and the other users.

It should be understood that one or more of the blocks in FIG. 3A or FIG. 3B may be performed in a different sequence or in an interleaved or iterative manner.

An example of a model for one possible implementation of system 100 will now be described, involving graph generator 102, page ranker 104 and login event scorer 106 performing steps of pre-processing login event data, generating a graph-based representation of the login event data, determining personalized PageRanks, determining a distance between the PageRank values, and identifying an anomaly score based on the distance, as described herein.

In some embodiments, the columns of interest in successful logon (event ID 4624) audit logs include: 'destination_account', 'destination_domain', 'client_workstation', 'client_ip', 'logon_type', 'orig_timestamp', 'computer_name', and 'exp-process_information-process_name'.

Figure 7:
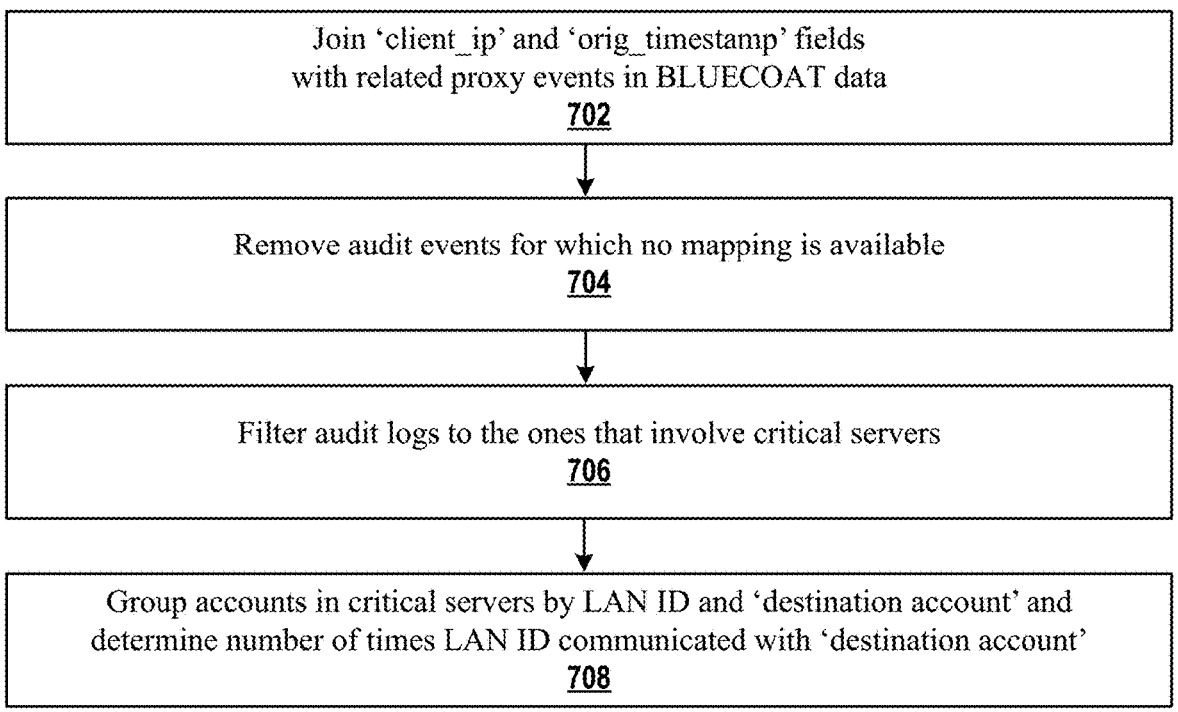
FIG. 7 illustrates, in a flowchart, an example of a method of feature processing, in accordance with some embodiments.

FIG. 7 illustrates, in a flowchart, an example of a method 700 of feature processing, in accordance with some embodiments. Input is SNARE events and BLUECOAT events in the given time window of length W.

At block 702, 'client ip' and 'orig_timestamp' fields are used to join with the related proxy events in proxy log data in order to map these IPs to local area network (LAN) identifiers (IDs). In some cases, such mapping is not possible (e.g., logon initiated from a server or that IP did not reach out to internet in near time so no proxy event was recorded).

At block 704, audit events for which no mapping is available are removed.

At block 706, audit logs are filtered to the ones that involve critical servers.

At block 708, accounts in critical servers are grouped by LAN ID and 'destination account', and the number of times a LAN ID communicated to 'destination account'. This aggregated data may now be ready to be represented as a graph.

Figure 8:
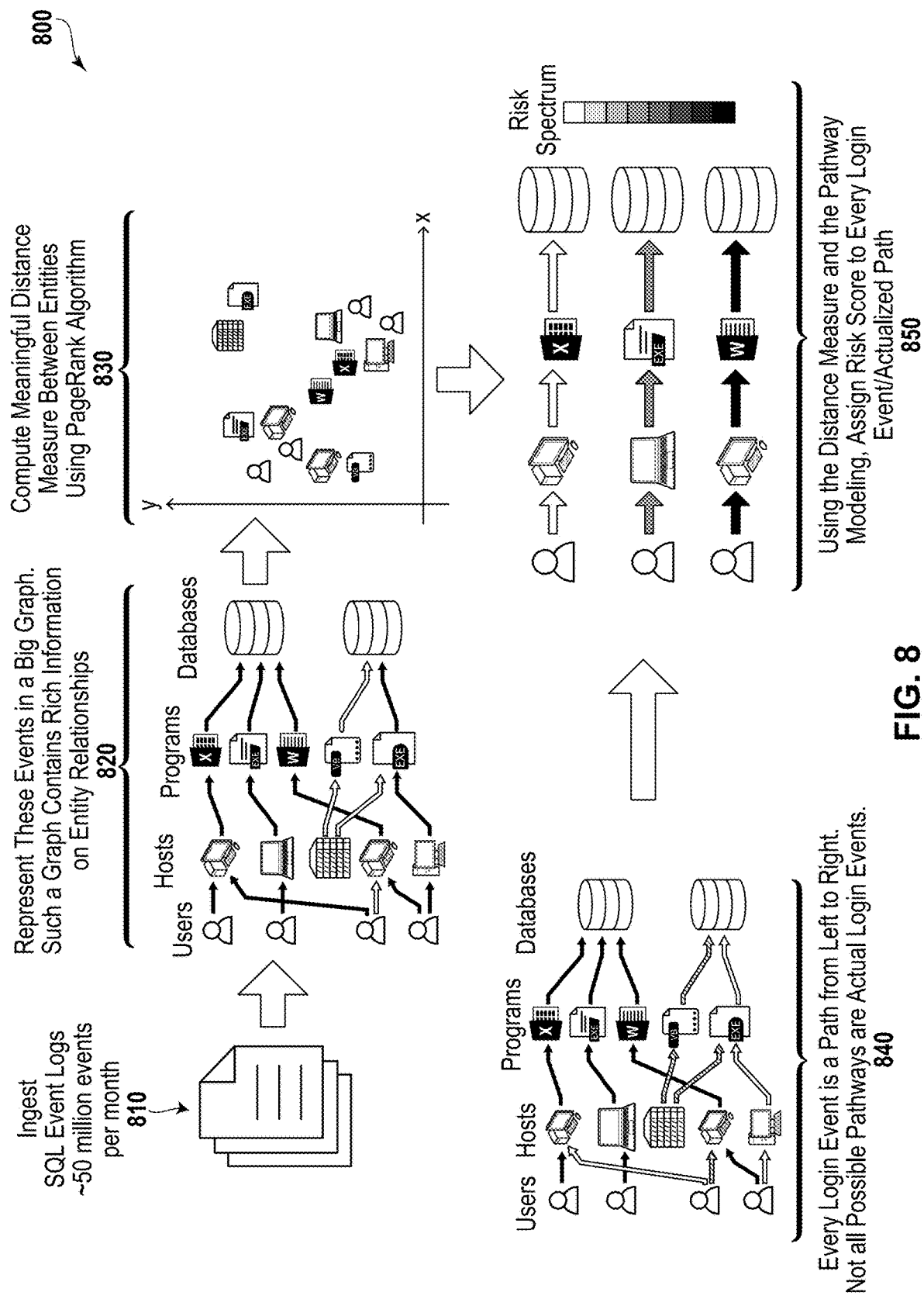
FIG. 8 illustrates another example of a system for monitoring database access, in accordance with some embodiments.

The following is an example of a pseudocode for a method of monitoring database access, in accordance with some embodiments:

1. Built the graph where vertices represent users or accounts and edges represent connections with weights denoting the number of occurrences of the connection.
2. For each destination account
    2.1 users_involved<=list of users that accessed the destination_account
    2.2 pairwise_distances=[ ][ ] # this is a square matrix of pairwise distances between users_involved
    2.3 for each user_I in users_involved
        2.3.1 for each user_J in users_involved:
            2.3.1.1 personal_page_rank_I<=run personal PageRank for user_I and convert it into a distribution of PageRank values (normalized) over all users in the whole graph
            2.3.1.2 personal_page_rank_J<=same as above but for user J
            2.3.1.3 distance<=KL_divergence (I,J)+KL_divergence(J,I)
            2.3.1.4 pairwise_distances[user_I][user_J]=distance
            2.3.1.5 pairewise_distance[users_J][user_I]=distance
    2.4 anomaly_score<=average value of non-diagonal elements of pairwise_distances
3. Return result_table in the form <detination_account, anomaly_score>
4. Sort result_table by anomaly_score and return top-k results FIG. 8 illustrates another example of a system 800 for monitoring database access, in accordance with some embodiments. System 800 approximates insights from a graph structure. SQL event logs may be ingested 810. In some embodiments, there could be over 50 million events per month. Next the events may be represented in a Big Graph 820 that includes rich information on entity relationships. For example, users, hosts, programs and databases may be the entities represented, and their communication links may be their relationships. A meaningful distance measure may be determined 830 between entities using a PageRank method described herein. A pathway model may be generated 840. Every login event may be a path from left to right in the Big Graph. However, not all possible pathways are actual login events. The distance measures 830 and the pathway model 840 may then be used to assign a risk score 850 to every login event/actualized path. For example, paths that occur frequently may be assigned a lower risk score, while anomalies (e.g., paths that do not usually occur for entities; or paths that are not login events) may be assigned a higher risk score.

In system 800, the modelling is performed based on a graph representation of data, and determining embeddings for nodes using the PageRank method which returns a probability distribution. Having embeddings as probability distributions allowed for the use of an asymmetric KL-distance metric. Asymmetric metrics are useful in terms of imposing some sort of hierarchical ordering among nodes. For example, this feature of KL may be used to infer privileges of accounts from data.

In some embodiments, in order to same on computational costs, PageRank embedding may be replaced with word2vec embedding. The assumptions going with word2vec embeddings are similar to those for PageRank based embedding. Here, the ensemble of login events may be treated as a text corpus where each login event is a sentence. Since each login event involves multiple entities (host, program, account, database), these entities can be treated as words. Given this modelling, the problem statement can be reduced to detecting either: 1) sentences that are anomalous 2) sentences in which there are anomalous words.

In some embodiments, 2) may be used since in 2) the word is judged in the context of the sentence in which it is mentioned. Given the word2vec embeddings for every entity in the given data (word2vec training details will be given below), the contextual anomalies may be checked in multiple ways. For example:

Given a login event of the form: <host,program,account, database> determine the cosine similarity between <host,program> and <account,database>, where join word2vec of two entities are calculated by taking their average word2vec vectors. The cosine similarity between <host,program> and <account,database> is then taken as the metric to judge anomalies. The lower the cosine similarity the more anomalous the login event is considered.

Computation of word2vec involves a training text corpus (ensemble of login events that occurred). In some embodiments, positive samples (login events that occurred) and negative samples (events randomly sampled) may be provided.

In some embodiments, negative samples may be developed that are difficult meaning they are very close to the events that actually occurred (similar nuances are relevant to the generative adversarial network (GAN) model). The graph representation of login events can be used to augment the positive data (login events that occurred) with data that can occur in principle (by sampling sentences from the graph since edges contain weights (#occurrences in the data)). Challenging negative samples can also be sampled from the graph. I.e., the sentences with lower probability but more likely than the random ones can be sampled.

In some embodiments, some databases and accounts that add substantial amount of noise may be filtered out. For example:

((db_user_name is null or db_user_name="N_A") or upper(DB_User_Name) not in ("NT AUTHORITY\\\SYSTEM","PZAUOSRV_APPUSER"))

and (Database_Name is not null and upper(Database_Name) not in ("N_A","N/A", "MSDB", "MASTER", "TEMPTDB", "MODEL","DYKE_TSS","DYKE_AUDIT","DYKE_CHGBK","DYKE_DASHBOARD","NULL","VWL0_DBA"))

Initial results based on the design above gave scores that correlate well (~0.5 Pearson) with previous KL-based scores. The correlation is stronger along with the extremes of the score distribution (this means it is higher than 0.5 if only extremes are looked at), which means similar scores are given out while saving a lot of computation. Top anomalies had a common structure (in terms of hostnames and software programs used). Those events tend to be the types that businesses find the riskiest (they initiate from workstations).

Personalized PageRank Vs Word2Vec

The kernel of the methods lie in the way they represent data (representation learning). Namely, some sort of distance metric between entities (ex. machines, users, accounts and etc.) may be defined.

Personal PageRank of a given node, ranks other nodes based on their ability to play the role of a hub for the given node. Two nodes are deemed close if their personal hubs overlap (this can be calculated in a continuous way since personal PageRanks are real values).

In Word2vec, two nodes are deemed closer if they co-occur often. For example, if one username co-occurs often with a particular machine then the vectors for the username and the machine will lie close together.

As will be seen below, both methodologies seek to learn a representation of the events, and then employ a metric to determine how anomalous an event is.

Figure 9:
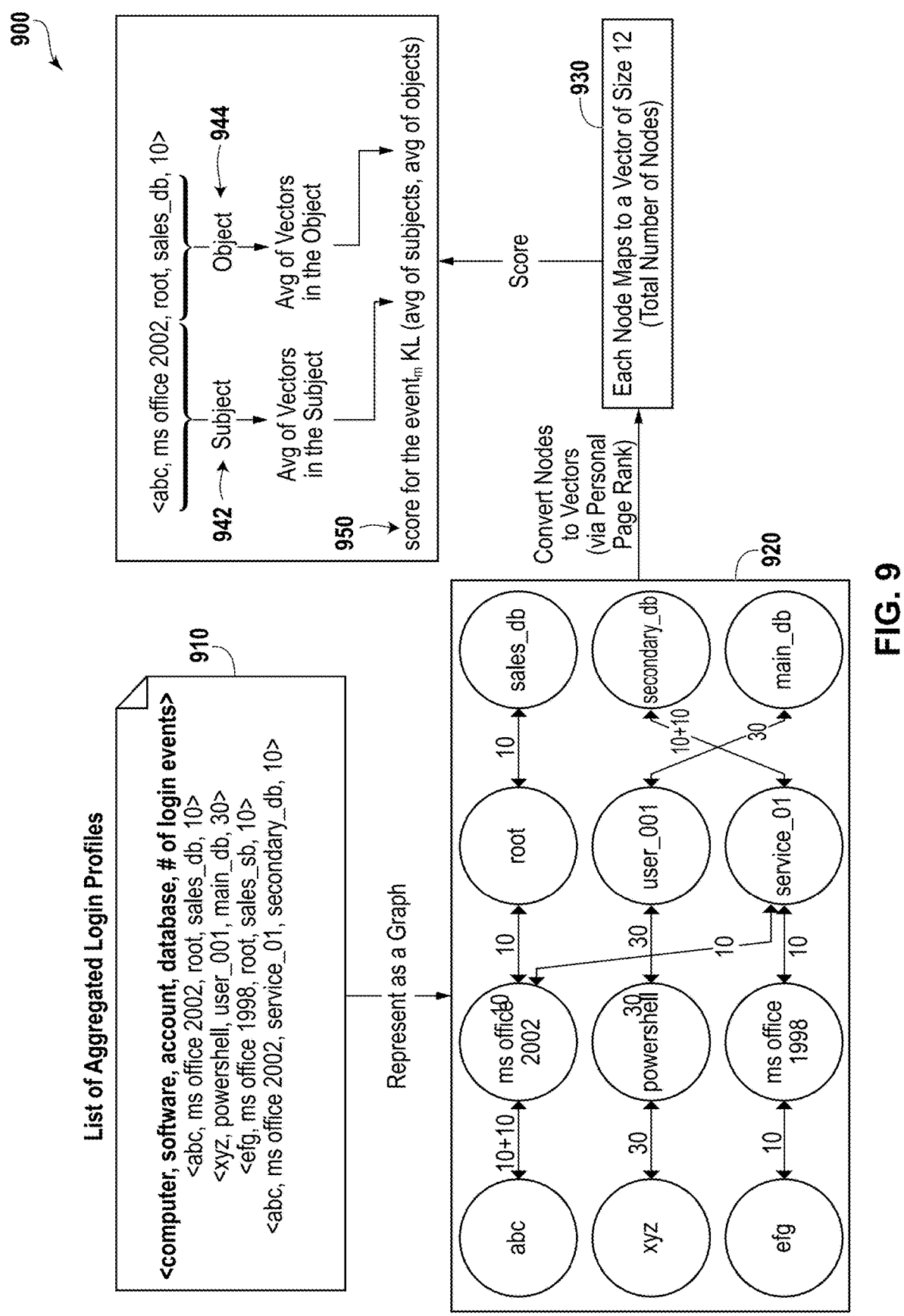
FIG. 9 illustrates, in a flow diagram, an example of a use case for monitoring database access using a personalized PageRank methodology, in accordance with some embodiments.

FIG. 9 illustrates, in a flow diagram, an example of a use case 900 for monitoring database access using a personalized PageRank methodology, in accordance with some embodiments. In this example, a list of login profiles 910 are collected in an exemplary format of:

<computer, software, account, database, # of login events>

The example list of aggregated login provides in example 910 include:

<abc, ms office 2002, root, sales_db, 10>
<xyz, powershell, user_001, main_db, 30>
<efg, ms office 1998, root, sales_db, 10>
<abc, ms office 2002, service_1, secondary_db, 10>

The login profiles are aggregated over a period of time. e.g. the event <abc, ms office 2002, root, sales_db> occurred 10 times. This frequency can then be adapted into a graph model 920 as an input edge weight. Note that in this example abc employs ms office 2002 in two different event profiles, so the edge between them is their sum, 10+10. The graph 920 is then used to generated Personal PageRank vectors 930 for each node, with the node used as the biased start. For example, each node maps to a vector of size 12 (total number of nodes). Nodes are then put into two groups, subject 942 or object 944. For a given Login Profile, the subject vectors are averaged, and so are the object. The metric then employed is the KL divergence. For example, in the entry <abc, ms office 2002, root, sales_db, 10>, the subject 942 is 'abc, ms office 2002' and the object 944 is 'root, sales_db'. The score for the events 950=KL (averages of subject, averages of objects).

Figure 10:
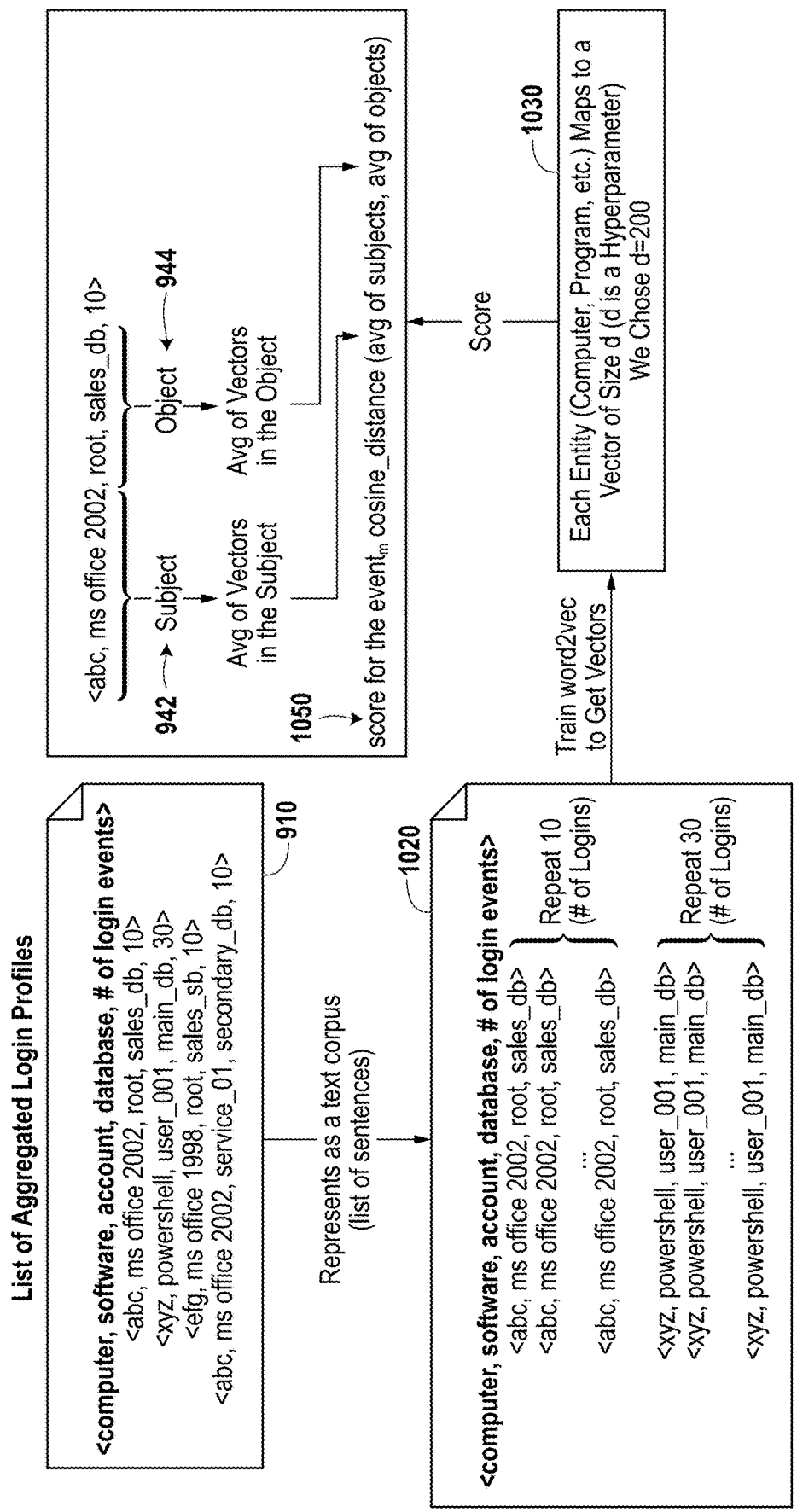
FIG. 10 illustrates, in a flow diagram, another example of a use case for monitoring database access using a word2vec methodology, in accordance with some embodiments.

FIG. 10 illustrates, in a flow diagram, another example of a use case 1000 for monitoring database access using a word2vec methodology, in accordance with some embodiments. In this example, the same list of login profiles 910 are collected.

In this example 1000, the login profiles 910 are also aggregated over a period of time. e.g. the event <abc, ms office 2002, root, sales_dv> occurred 10 times. This frequency can then be represented as the number of times the data is fed into a word2vec model. For example, the login profiles 910 can be represented as a text corpus 1010 (list of sentences) where each login event is repeated/listed a number of times equal to the number of login events. This model can then learn vectors 1030 for each "word" or entity. For example, each entity (computer, program, etc.) maps to a vector of size d (where d is a hyperparameter). In some embodiments, d=200. Nodes are then put into two groups, subject 942 or object 944. For a given Login Profile, the subject vectors are averaged, and so are the object vectors. The metric employed here is the cosine distance. For example, the score for the event 1050=cosine_distance (average of subjects, average of objects).

In some embodiments, the final thresholding is performed by plotting the scores from either approach into a distribution. This allows for a determination of a value beyond which lies the tail of the distribution.

In some embodiments, recommendations or actions may result from a determination that a login event deviates from a normal behavior. For example, if a risk score for an event is over a threshold, a warning message may be sent to an account administrator, a recommendation message may be sent to an account administrator or to an account user, an account may be locked or recommended to be locked, a domain may be blocked or recommended to be blocked, an IP address or host name may be blocked, two-factor authentication may be required, or a password reset may be required. The login event entities may be correlated with other anomalous events (e.g., user clicking on a suspicious link, server beaconing to an unknown domain, etc.). The login event risk score may be aggregated with risk scores for other events pertaining to the subject or object.

Figure 11:
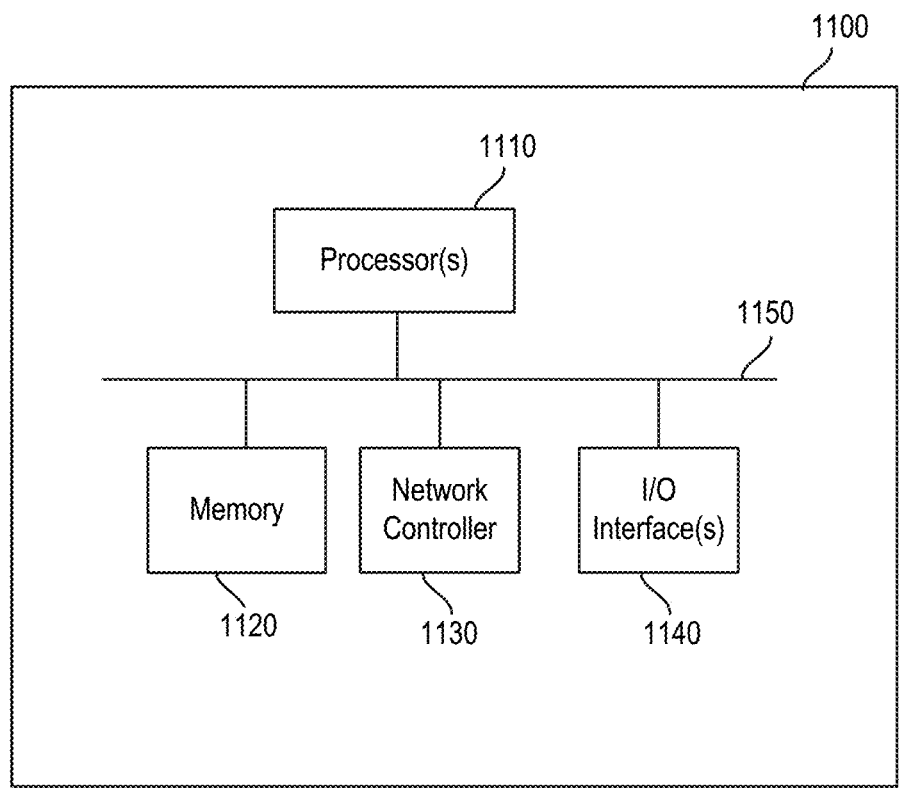
FIG. 11 illustrates an example of a computing device such as a server.

Systems 100, 800 may be implemented as software and/or hardware, for example, in a computing device 1000 as illustrated in FIG. 11. Methods 300, 500, 700, in particular, one or more of blocks 302 to 312, blocks 502 to 510, and blocks 702 to 708 may be performed by software and/or hardware of a computing device such as computing device 1000.

As illustrated, computing device 1000 includes one or more processor(s) 1110, memory 1120, a network controller 1130, and one or more I/O interfaces 1140 in communication over bus 1150.

Processor(s) 1110 may be one or more Intel x86, Intel x64, AMD x86-64, PowerPC, ARM processors or the like.

Memory 1120 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 1130 serves as a communication device to interconnect the computing device with one or more computer networks such as, for example, a local area network (LAN) or the Internet.

One or more I/O interfaces 1140 may serve to interconnect the computing device with peripheral devices, such as for example, keyboards, mice, video displays, and the like. Such peripheral devices may include a display of device 1100. Optionally, network controller 1130 may be accessed via the one or more I/O interfaces.

Software instructions are executed by processor(s) 1110 from a computer-readable medium. For example, software may be loaded into random-access memory from persistent storage of memory 1120 or from one or more devices via I/O interfaces 1140 for execution by one or more processors 1110. As another example, software may be loaded and executed by one or more processors 1110 directly from read-only memory.

Example software components and data stored within memory 1120 of computing device 1100 may include software to monitor and evaluate database access, as described herein, and operating system (OS) software allowing for basic communication and application operations related to computing device 1100.

Memory 1120 may include machine learning code with rules and models or a suitable artificial neural network. The machine learning code can refine based on learning.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

The discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer system comprising:
   at least one processor, and
   a memory comprising instructions which, when executed by the processor, configure the processor to:
   receive login event data;
   generate a vector representation of a subject entity and a vector representation of an object entity associated with a login event in the login event data;
   determine a login event distance between a linear combination of the vector representation of the subject entity and a linear combination of the vector representation of the object entity, the linear combination of the vector representation of the subject entity comprising at least an identified computer and an identified software on the identified computer, and the linear combination of the vector representation of the object entity comprising an account identifier; and
   determine an anomaly score for the subject entity and the object entity, based at least in part on the login event.

2. The system as claimed in claim 1, wherein the at least one processor is configured to:
   generate vector representations of a plurality of subject entities and a plurality of object entities associated with a plurality of login events in the login event data;
   determine, for each login event, a respective login event distance between a linear combination of the respective vector representation of the subject entity and a linear combination of the respective vector representation of the object entity;
   determine a distribution for the login event distances;
   determine a threshold value based on the distribution; and
   identify an anomaly login event by its distance being past the threshold value.

3. The system as claimed in claim 2, wherein the vector representations comprise graph-based representations of the login event data.

4. The system as claimed in claim 3, wherein the graph-based representations comprise personalized PageRank vectors.

5. The system as claimed in claim 2, wherein:
   The login event distances comprise Kullback-Leibler (KL) divergences.

6. The system as claimed in claim 2, wherein the vector representations comprise learned embedding type vector representations of the login event data.

7. The system method as claimed in claim 6, wherein a neural network is trained to learn the embedding type vector representations.

8. The system as claimed in claim 2, wherein:
   the login event distances comprise cosine distances.

9. The system as claimed in claim 1, wherein the at least one processor is configured to assign a risk score to each login event.

10. The system as claimed in claim 9, wherein the at least one processor is configured to at least one of:
    send a recommendation message to an administrator when the risk score is over a threshold;
    lock a user account if the risk score is over a threshold;

require two-factor authentication if the risk score is over a threshold;
require a password reset if the risk score is over a threshold;
correlate the login event entities with other anomalous events;
aggregate the login event risk score with risk scores for other events pertaining to the subject or object; or
block an IP address or host name if the risk score is over a threshold.

11. A computer-implemented method comprising:
receiving login event data;
generating a vector representation of a subject entity and a vector representation of an object entity associated with a login event in the login event data;
determine a login event distance between a linear combination of the vector representation of the subject entity and a linear combination of the vector representation of the object entity, the linear combination of the vector representation of the subject entity comprising at least an identified computer and an identified software on the identified computer, and the linear combination of the vector representation of the object entity comprising an account identifier; and
determining an anomaly score for the subject entity and the object entity, based at least in part on the login event distance.

12. The computer-implemented method as claimed in claim 11, comprising:
generating vector representations of a plurality of subject entities and a plurality of object entities associated with a plurality of login events in the login event data;
determining, for each login event, a respective login event distance between a linear combination of the respective vector representation of the subject entity and a linear combination of the respective vector representation of the object entity;
determining a distribution for the login event distances;
determining a threshold value based on the distribution;
identifying an anomaly login event by its distance being past the threshold value.

13. The computer-implemented method as claimed in claim 12, wherein the vector representations comprise graph-based representations of the login event data.

14. The computer-implemented method as claimed in claim 13, wherein the graph-based representations comprise personalized PageRank vectors.

15. The computer-implemented method as claimed in claim 12, wherein:
the login event distances comprise Kullback-Leibler (KL) divergences.

16. The computer-implemented method as claimed in claim 12, wherein the vector representations comprise learned embedding type vector representations of the login event data.

17. The computer-implemented method as claimed in claim 16, wherein a neural network is trained to learn the embedding type vector representations.

18. The computer-implemented method as claimed in claim 12, wherein:
the login event distances comprise cosine distances.

19. The computer-implemented method as claimed in claim 11, comprising assigning a risk score to each login event.

20. The computer-implemented method as claimed in claim 19, comprising at least one of:
sending a recommendation message to an administrator when the risk score is over a threshold;
locking a user account if the risk score is over a threshold;
requiring two-factor authentication if the risk score is over a threshold;
requiring a password reset if the risk score is over a threshold;
correlating the login event entities with other anomalous events;
aggregating the login event risk score with risk scores for other events pertaining to the subject or object; or
blocking an IP address or host name if the risk score is over a threshold.

* * * * *